United States Patent Office 2,984,737
Patented May 16, 1961

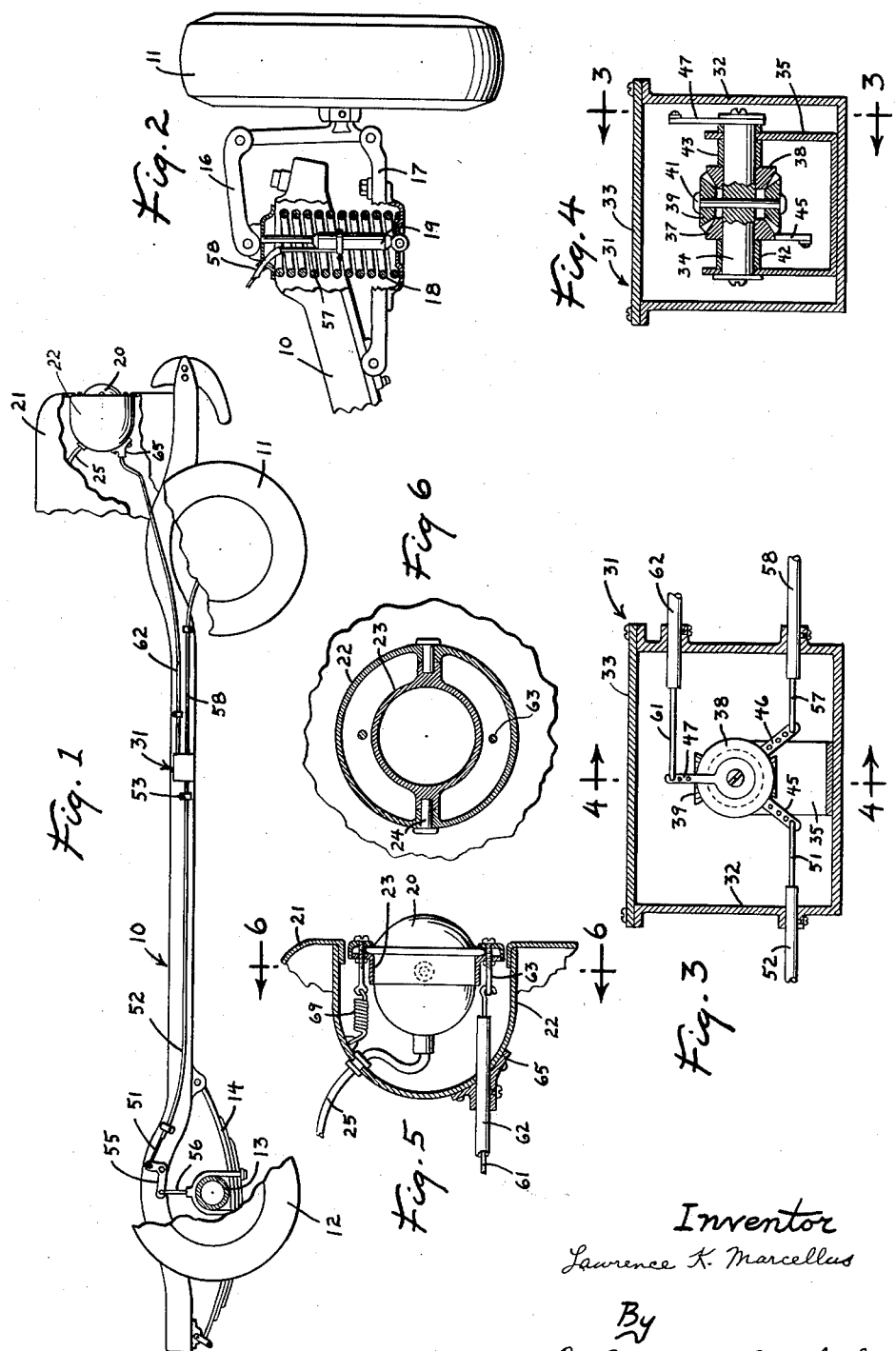

2,984,737

HEAD LAMP ADJUSTING MECHANISM

Lawrence K. Marcellus, P.O. Box 2, Belvidere, Ill.

Filed June 6, 1957, Ser. No. 664,115

5 Claims. (Cl. 240—7.1)

This invention relates to improvements in vehicle head light adjusting devices.

An important object of this invention is to provide an improved vehicle head light adjusting apparatus which maintains the vehicle head lights in a preselected angular relationsip with respect to the road surface, substantially independent of the changes in the angular relationship of the vehicle body, with respect to the road surface, as occurs when the vehicle is loaded.

Another object of this invention is to provide a vehicle head lamp adjusting apparatus which detects changes in the spacing between the vehicle body and both the front and rear wheels thereof and which operates to swing the head lamp relative to the body in response to the differential change in spacing between the body and each of the front and rear wheels thereof.

A more particular object of this invention is to provide a head lamp adjusting mechanism including a swingably supported light projector and a differential gear mechanism for operatively connecting the light projector to each of the front and rear wheels of the vehicle to maintain the light projector in a preselected angular relationship with respect to the road surface.

These, together with various ancillary objects and advantages of this invention will be more readily appreciated as the same becomes better understood by reference to the following detailed description when taken in connection with the accompanying drawings wherein:

Figure 1 is a side elevational view of a portion of a motor vehicle showing the invention applied thereto;

Figure 2 is a fragmentary view of the vehicle front suspension and illustrating the connection of the head lamp adjusting mechanism to the front wheel of the vehicle;

Figure 3 is a longitudinal sectional view through the differential mechanism for connecting the front and rear wheels of the vehicle to the adjustable head lamp and taken on the plane 3—3 of Fig. 4;

Figure 4 is a transverse sectional view through the mechanism of Figure 3, and taken on the plane 4—4 of Fig. 3;

Figure 5 is an enlarged longitudinal section through the head lamp mounting; and Figure 6 is a transverse sectional view taken on the line 6—6 of Fig. 5.

As is well known, the angular relationship between the vehicle body and the road surface changes as the vehicle is loaded. This is particularly noticeable in passenger cars and in small trucks. In general, the distribution of the load carrying areas in such vehicles is closer to the rear wheels than to the front wheels of the vehicle with the result that the rear portion of the vehicle is depressed, when loaded, to a greater extent than the front portion of the vehicle. If the head lamps are fixedly mounted on the vehicle, it is apparent that the change in the angular relationship of the vehicle body with respect to the road surface will also change the angular relationship of the vehicle head lamps with respect to the road surface.

In accordance with the present invention, the head lamps or light projectors on the vehicle are supported for angular adjustment in a vertical plane and provision is made for maintaining the vehicle head lamps in a preselected angular relationship with respect to the road surface, substantially independent of the changes in the angular relationship of the vehicle body with respect to the road surface.

Referring to Figure 1, the numeral 10 designates the vehicle body or chassis having front and rear support wheels 11 and 12. As is conventional, a resilient suspension is provided for both the front and rear wheels, and, in the specific embodiment shown, the rear axle 13 is supported by a leaf spring 14 on the chassis. As shown in Figure 2, the front wheels 11 are resiliently supported on the chassis 10 by upper and lower control arms 16 and 17 and a spring 18 which is interposed between the chassis and the lower control arm. A shock absorber 19 is connected to the lower control arm and to the chassis. While a specific spring suspension system is herein illustrated for the front and rear wheels of the vehicle, it is apparent that any other suitable resilient suspension for the wheels may be provided, and that the specific spring suspension for the wheels forms no part of the present invention.

Any suitable arrangement may be provided for swingably supporting the vehicle head lamps on the chassis and, in the specific embodiment illustrated in Figs. 1 and 5, the vehicle mud guard or fender 21 has a well 22 formed in the forward end thereof for reception of the vehicle head lamp. A lamp supporting ring 23 is pivotally mounted by means of pins or trunnions 24 on the well 22 for limited pivotal movement about the axis of the pins 24. The head lamp 20 may be clamped in any suitable manner to the ring 23. As is conventional, the head lamp is connected through suitable conductors 25 to a source of power and to the switches (not shown) provided for controlling energization of the head lamps.

A head lamp adjusting apparatus 31 is provided which is operatively connected to both the front and rear wheels of the vehicle to detect the change in spacing between the front and rear wheels and the body and is operative to swing the head lamp in accordance with the change in spacing between the wheels and the body. The apparatus 31 includes a housing 32 having a cover plate 33 and which may be mounted at any convenient location on the vehicle chassis. A shaft 34 is rotatably supported on a bracket 35 attached to the housing. Spaced side gears 37 and 38 are mounted on the shaft 34 for rotation relative thereto about the axis of the shaft and one or more pinion gears 39 are rotatably supported on a pin 41 attached to the shaft for rotation about an axis perpendicular to the shaft. As is apparent from Figure 4, the side gears 37 and 38 each mesh with the pinion gears 39 and are conveniently retained in proper position on the saft by means of sleeves 42 and 43 which are interposed between the side gears and the bracket 35.

A lever 45 is attached to or formed integrally with one of the side gears 37 and a second lever 46 is provided on the other of the side gears 38. A third lever 47 is non-rotatably attached to the shaft 34, as is clearly shown in Figure 4.

The head lamp adjusting apparatus 31 may be connected in any desired manner to the front and rear wheels, to detect the change in spacing between the front and rear wheels and the automotive chasis. As shown, the lever 45 is connected by a Bowden wire including a wire 51 and an enclosing tube 52, to the rear axle 13. The wire is connected to the lever 45 and the enclosing tube 52 is fixedly attached to the housing 32 and to the vehicle body as by suitable clamps 53. The other end of the wire 51 is connected by a bell crank 55 and link 56 to the rear axle 13. The other lever 46 is similarly connected by a Bowden wire to the front wheel assembly 11. In particular, one end of the wire 57 is attached to the lever 46 and the other end of the wire is attached to a movable portion of the front wheel suspension as by connection to the shock absorber 19. The enclosing tube 58 for the wire 57 is anchored at one end to the vehicle frame and at the other end to the housing 32. The lever 47, carried by the shaft 34, is also conveniently connected by a Bowden wire to the head lamp. As shown, the wire 61 is attached at one end to the lever 47 and at the other end thereof to a pin 63 carried by the head lamp support ring 23. The enclosing tube 62 is anchored at one end on the housing 32 and at the other end by a bracket 65 on the well portion 22 of the mud guard.

When initially installing the head lamp adjusting apparatus, it is, of course, necessary to focus and direct the beams from the head lamp while the vehicle is at rest and unoccupied. This may conveniently be achieved by adjusting the connection of the wire 61 to the pin 63 on the head lamp. When the vehicle is thereafter occupied or loaded, there will be a change in the relative spacing between the vehicle chassis and the front wheels or between the vehicle chassis and the rear wheels, or both. The position of the levers when the vehicle is unoccupied or unloaded, is shown in Figure 3. When the vehicle is subsequently loaded in a manner to weight down the rear portion of the vehicle, the spacing between the chassis and the axle 13 will decrease. This change in the relative spacing between the rear axle and the chassis is detected by the link 56 and bell crank 55 and transmitted through the Bowden wire 51 to the lever 45 to move the latter in a counterclockwise direction as viewed in Figure 3. This will rotate the side gear 37 in a counterclockwise direction. If the weight applied to the vehicle is such that there is no change in the relative spacing between the front wheels and the chassis, the other side gear 38 will remain stationary. Consequently, the aforementioned counterclockwise rotation of the side gear 37 will rotate pinions 39 which also mesh with the stationary side gear 38 and thereby cause the shaft 34 to turn a preselected amount in a counterclockwise direction. This rotation of the shaft 34 is transmitted through the lever 47 and Bowden wire 61 to the head lamp to swing the latter downwardly and thereby compensate for the change in the angular relationship of the vehicle chassis with respect to the road surface. Obviously, the amount of movement which must be transmitted to the head lamp to compensate for a preselected change in spacing between the chasis and the wheels, will vary with different vehicles. The magnitude of the movement transmitted to the head lamp, for any given change in spacing between the chassis and one of the wheels, can be readily varied by adjusting the point on the arms 45, 46 and 47 to which the respective wires 51, 57 and 61 are connected.

If the load applied to the vehicle chassis is such as to change the spacing between the chassis and each of the front and rear wheels thereof, it is apparent that the head lamp will be readjusted only if the change in spacing between the front wheel and the chassis differs from the change in spacing between the rear wheel and the chassis. Thus, if the spacing between the chassis and the front and rear wheels is decreased by a like amount, the levers 45 and 46 will be moved in equal arcs and in relatively opposite directions so that the respective gears 37 and 38 thereon are rotated in opposite directions. Under these conditions, the pinions 39 merely rotate about the pin 41 and do not cause any rotation of the shaft 34. If, on the other hand, the change in spacing between the front wheel and the chassis is less than the change in space between the rear wheel and the chassis, then the gear 37 will be rotated through a relatively greater arc in a counterclockwise direction than the gear 38 is rotated in a clockwise direction with the result that the shaft 34 will be turned in a counterclockwise direction through an arc which is correlated with the difference in the angular displacement of the gears 37 and 38. The shaft 34 operating through lever 47 and wire 61 will swing the lamp downwardly to compensate for the change in the angular relationship of the chassis with respect to the road surface. As shown in Figs. 1 and 3, a spring is attached to the lamp support ring 23 to normally urge the lamp in a counterclockwise direction as viewed in Figure 1 to thereby maintain the wire 61 and the wires 51 and 57 under tension.

I claim:

1. In combination with a vehicle including a body having front and rear support wheels, a light projector mounted on the body for vertical swinging movement, a first means for detecting a change in spacing between the front wheels and the body, a second means for detecting a change in spacing between the rear wheels and the body, a differential apparatus including a shaft mounted for rotation about its axis, a first drive means operatively connecting said first means to said shaft for rotating said shaft in one direction in response to a decrease in spacing between the body and front wheels and for rotating the shaft in the other direction in response to an increase in the spacing between the body and front wheels, a second drive means operatively connecting said second means to said shaft for rotating said shaft in said other direction in response to a decrease in the spacing between the body and the rear wheels and for rotating said shaft in said one direction in response to an increase in the spacing between the body and the rear wheels, and means operatively connecting said shaft to said light projector to swing said light projector upwardly when said shaft is rotated in said one direction and for swinging said light projector downwardly when said shaft is rotated in said other direction.

2. The combination of claim 1 wherein said first and second drive means each include a gear mounted on said shaft for rotation relative thereto about the axis of the shaft, and an idler gear mounted on the shaft for rotation about an axis perpendicular to the shaft and in meshing engagement with each of the other of said gears.

3. The combination of claim 2 including means yieldably urging said light projector in one direction of movement thereof.

4. In combination with a vehicle including a body, front and rear wheels mounted on the body for vertical movement relative thereto, a light projector mounted on the body for swinging movement in a vertical plane, a first means for detecting the vertical spacing between said front wheels and the body, a second means separate from said first detecting means for detecting the vertical spacing between said rear wheels and said body, operating means connected to said light projector and movable in relatively opposite directions for tilting said projector upwardly and downwardly, and a differential gear mechanism having first and second drive gears connected to said first detecting means and to said second detecting means and a follower gear connected to said operating means for moving said operating means respectively in a direction to tilt the projector downwardly in response to a decrease in the spacing between the body and the rear wheels from a preselected spacing and for moving said operating means in the opposite direction to tilt the projector upwardly in response to a decrease in the spacing between the body and the front wheels from a preselected spacing.

5. In combination with a vehicle including a body, front and rear wheels mounted on the body for movement relative thereto, a light projector mounted on the body for swinging movement in a vertical plane, a first detecting means for detecting the vertical spacing between at least one front wheel and the body, a second detecting means independent of said first detecting means for detecting the vertical spacing between at least one rear wheel and the body, a differential motion mechanism having two driving elements and a follower element, said differential mechanism having means connecting the driver elements to the follower element to move the latter in one direction when either driver element is moved in one direction and to move the follower element in the opposite direction when either driver element is moved in the other direction whereby the follower element moves in a direction and amplitude corresponding to the combined movements of the two driver elements and the follower element remains stationary when the driver elements are moved corresponding amounts in relatively opposite directions, means connecting said first and second driver elements to said first and second detecting means for moving the driver elements in relatively opposite directions in response to a similar change in spacing between the frame and both the front and rear wheels, and means connecting said follower element to said light projector for swinging the latter.

References Cited in the file of this patent

UNITED STATES PATENTS

| | | |
|---|---|---|
| 1,762,877 | Moreton | June 10, 1930 |
| 2,105,866 | Sheaffer | Jan. 18, 1938 |
| 2,456,287 | Kennelly | Dec. 14, 1948 |
| 2,605,388 | Theisen | July 29, 1955 |

FOREIGN PATENTS

| | | |
|---|---|---|
| 447,863 | Great Britain | May 27, 1936 |